(12) United States Patent
Fukuyama

(10) Patent No.: US 6,210,735 B1
(45) Date of Patent: *Apr. 3, 2001

(54) PROCESS FOR PRODUCING QUICK-BOILING OR INSTANT COOKING PASTAS AND NOODLES

(75) Inventor: Teruyasu Fukuyama, Kagoshima-ken (JP)

(73) Assignee: Feed Up Inc., Kagoshima-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/787,517

(22) Filed: Jan. 22, 1997

(30) Foreign Application Priority Data

| Jan. 22, 1996 | (JP) | 8-008695 |
| Jan. 22, 1996 | (JP) | 8-008696 |
| Jan. 22, 1996 | (JP) | 8-008697 |
| Mar. 8, 1996 | (JP) | 8-051541 |

(51) Int. Cl.[7] ........................... A23L 1/162
(52) U.S. Cl. ............ 426/557; 426/451; 426/455; 426/497; 426/506
(58) Field of Search ................ 426/557, 451, 426/496, 497, 506, 455

(56) References Cited

U.S. PATENT DOCUMENTS

| 4,271,205 | * | 6/1981 | Kaneko | 426/557 |
| 4,973,487 | * | 11/1990 | Wyss et al. | 426/557 |
| 4,990,349 | * | 2/1991 | Chawan et al. | 426/557 |
| 5,573,804 | * | 11/1996 | Hsu | 426/557 |
| 5,599,573 | * | 2/1997 | Barnes et al. | 426/557 |

FOREIGN PATENT DOCUMENTS

| 1587977 | 4/1981 | (GB) . |
| 2090113 | 7/1992 | (GB) . |
| 2294860 | 5/1996 | (GB) . |
| 9007237 | * 10/1990 | (KR) . |

OTHER PUBLICATIONS

Patent Abstracts of Japan, vol. 010, No. 136, May 20, 1986, JP 60 259154 A, Dec. 21, 1985.
Patent Abstracts of Japan, vol. 010, No. 094, Apr. 11, 1986, JP 60 224458 A, Nov. 8, 1985.
Patent Abstracts of Japan, vol. 011, No. 315, Oct. 14, 1987, JP 62 100255 A, May 9, 1987.
Patent Abstracts of Japan, vol. 011, No. 354, Nov. 18, 1987, JP 62 126946 A, Jun. 9, 1987.

* cited by examiner

*Primary Examiner*—Lien Tran
(74) *Attorney, Agent, or Firm*—Browdy and Neimark

(57) ABSTRACT

Quick boiling or instant cooking noodles such as udon, soba and hiyamugi or pastas such as spaghetti or macaroni can be produced by a process which includes the steps of heating dry noodles or pastas with either wet or dry heat for a short time to modify only the surface layer portion of the noodles or pastas, removing the surface moisture if the heating is done by wet heat, subsequently contacting the noodle or pasta strings with water to have it absorbed, and reheating the noodles or pastas if the final product is of an instant cooking type. The noodles or pastas thus produced can be prepared by merely boiling them for a short time or by simply pouring in hot water and letting stand for a short time or by just cooking them in a microwave oven; the thus prepared noodles or pastas have the same texture as is obtained by fully boiling dry or raw noodles or pastas.

28 Claims, No Drawings

PROCESS FOR PRODUCING QUICK-BOILING OR INSTANT COOKING PASTAS AND NOODLES

BACKGROUND OF THE INVENTION

This invention relates to a process for producing pastas such as spaghetti, macaroni and shells or noodles such as soba, udon, hiyamugi, kishimen or Chinese noodles that can be prepared by boiling within as short times as are required to cook "instant ramen" or by the simple procedure of pouring in hot water and letting stand for a while as in the case of "instant cup noodles" and which yet can be served to provide good palatability.

Pastas are produced by adding water to wheat flour, kneading the mixture to prepare a dough of firm consistency and shaping the dough by extrusion through an extruder or the like under high pressure. Typically, the semolina of durum which is a hard wheat (or high gluten content) is used as a primary raw material, which is occasionally mixed with egg white, milk and other ingredients. The pastas thus produced are in hard and dense shapes. Pastas are prepared by boiling and cooked to provide such a moisture gradient that the moisture content in the center of the pasta is lower than the surface moisture content; the pastas are said to taste the best when served "al dente" with a "firm" texture.

To create the "al dente" condition, the use of dry or raw pastas is preferred; however, these pastas take a long time to boil and are unsuitable for the case where convenience and speed in cooking are required.

Several methods have been attempted to serve pastas "al dente" with improved convenience and speed in cooking and they include providing V cuts along the strings of pastas such as spaghetti or quickly freezing pastas that have been boiled "al dente". However, even the pastas with V cuts cannot be cooked as quickly and conveniently as "instant noodles". Frozen pastas have no problems with quality but because of the limitations in distribution and storage on the market, they have not become as popular as "instant noodles".

As for noodles including udon, soba, hiyamugi, kishimen and Chinese noodles, various methods have also been proposed to accomplish the manufacture of quick boiling products. According to the known proposals, partially cooked noodles prepared by boiling raw noodles for a short time or boiled products prepared by boiling raw or dry noodles are distributed either chilled or frozen. However, these partially cooked noodles or preboiled noodles have had the problem that during the distribution, not only their palatability deteriorates but also the strings become "too tender" with the lapse of time, thereby deteriorating in texture.

Various types of "instant noodles" are manufactured and sold on the market. They are produced by either frying raw noodles with oil or fats or steaming them followed by drying. However, either type of products has the disadvantage that when cooked, the noodles do not have as firm a texture as the products prepared by boiling dry or raw noodles.

Under the circumstances, it has been desired to develop either quick boiling pastas or noodles that can be prepared and served "al dente" or with firm consistency by merely boiling for a comparatively short time, say, within 3 minute or instant cooking pastas or noodles that can be similarly prepared and served by just pouring in hot water and letting stand for a while or, alternatively, heating in a microwave oven.

SUMMARY OF THE INVENTION

The present invention provides a process for the manufacture of quick boiling or instant cooking pastas or noodles (pastas and noodles are hereunder sometimes collectively referred to as "pasta or the like") which comprises heating dry pasta or the like with either wet or dry heat to modify the surface layer portion, drying the surface of the pasta or the like if the heating is done by wet heat, contacting the pasta or the like with cool or heated water to have it absorbed, and reheating the pasta or the like if the final product is of an instant cooking type. The quick boiling or instant cooking pastas produced by the process of the invention can be cooked to the same "al dente" condition or the same consistency as can be attained upon prolonged boiling of dry or raw pastas by merely boiling for a short period on the order of 0.5–3 minutes or by just pouring in hot water, letting stand for about 0.5–3 minutes and discarding the water, or by simply heating in a microwave oven for a short time.

Having these advantages, the process of the invention comprises the steps of heating dry pastas or noodles to modify the surface layer portion, drying the pasta or the like to remove the surface moisture if the heating is done by wet heat, having the surface-modified pasta or the like absorb water by immersing in or spraying with water at an ordinary or elevated temperature such as to establish contact with the water, and reheating the pasta or the like if the final product is of an instant cooking type.

The process of the invention for producing quick- boiling or instant cooking pasta or the like uses the common dry pasta or the like as a starting material. When immersed in water, dry pastas or noodles will generally absorb water to swell over time to acquire physical properties similar to those of raw pastas or noodles; on the other hand, the swollen product will dissolve at the surface to be leached into water and the surface becomes so fragile that it will be disintegrated by a small physical force.

DETAILED DESCRIPTION OF THE INVENTION

In the present invention, the step of swelling by water absorption is preceded by a heat treatment which is effected for a short but sufficient time to form a modified starch film on the surface of the dry pasta or the like. Because of this starch modification, the surface of the pasta or the like will neither dissolve nor disintegrate even if it absorbs water in the subsequent water absorption swelling step and it is possible to produce pasta or the like which retains a smooth surface even after absorbing water. Stated more specifically, the dry pastas or noodles are heated for a short but sufficient time to modify an extremely thin surface layer while leaving the central portion dry. The term "modification" of starch as used herein shall mean not only conversion to the a-starch as by wet heat but also the case where the surface portion of the pasta or the like is modified physically or chemically by dry heat to such a state that the surface portion of the pasta or the like will neither dissolve nor disintegrate even if it is contacted with water in the subsequent step of water absorption.

The heating method is effected with wet heat as by immersing hot water or by steaming with water vapor or with dry heat as by exposure to heat rays or heated air. If heated air is to be employed, the dry pasta or the like may be passed through the heated air or sprayed with it. However, heating with dry heat is preferred since the pasta or the like will be less sticky on the surface after the heating, thereby eliminating the need to provide an additional step for removing the moisture.

The heating may be performed at any temperature that is high enough to modify the starch in the surface layer portion of the pasta or the like and it may range from about 40° C. up to a point just below the temperature at which the surface of the pasta or the like scorches (in the case of heating with dry heat). In steaming with water vapor, heating beyond 100° C. is possible by using superheated steam.

The heating temperature ranges usually from 60 to 200° C. and preferably from 60 to 160° C. with the range of 60–95° C. being more preferred. The heating time varies with the heating temperature, the type of the pasta or the like, their shape, size and thickness but it ranges preferably from several seconds to 30 minutes, more preferably from 10 seconds to 25 minutes. If heating is performed for an unduly short time at high temperatures, the pasta or the like will be heated unevenly or some areas of the surface will be left uncovered with the modified film. If the heating time is unduly long, the pasta or the like tends to be chunky and deteriorated in quality. Optimal heating conditions can be appropriately selected from the above-stated ranges in accordance with the type and shape of the pasta or the like, as well as the object of their use.

As a consequence of the heating for surface modification, the central portion of the pasta or the like remains dry but a thin modified starch film will form on the surface. The pasta or the like which has been thusly modified only in the surface layer portion is immediately subjected to the subsequent step of water absorption but, if desired, it may be left to stand for preliminary cooling.

If the α-converted or otherwise modified starch film is formed on the pasta or the like by heating with wet heat, moisture remains on the surface of the pasta or the like to make it sticky and thereby present inconvenience in subsequent processing and handling procedures. In order to eliminate this problem, the pasta or the like which has been surface-modified with wet heat is dried with cool or hot air or by some other suitable means to remove the surface moisture prior to the subsequent step of water absorption. As already mentioned, the pasta or the like which has been heated with dry heat does not have a sticky surface even after it absorbs water and, hence, the heating with dry heat which can be implemented by a simpler process than the heating with wet heat is preferred.

The heat-treated pasta or the like is subsequently allowed to absorb water by suitable means of contact such as immersing or shower spraying. The heat-treated pasta or the like already has a thin modified starch film on the surface and, hence, is free from the problem of surface dissolution or disintegration even if it is contacted with water.

The water to be used in the step of water absorption may be cooler than 35° C. or hotter than 35° C. The temperature of the water to be used varies with the equipment used or the time desired for water absorption and the higher the water temperature, the shorter the time of water absorption, thereby allowing the desired amount of water to be absorbed within the shorter time.

The time for water absorption varies with the temperature of the water to be absorbed, as well as the shape, size or thickness of the pasta or the like. As just mentioned above, the water temperature affects the time for water absorption and the higher the water temperature, the shorter the time that is required to complete the step of water absorption. Consider, for example, the case of immersing spaghetti (string diameter=1.7 mm) in water;

the temperature of the water has the following relationship with the time for water absorption:

| Temperature of water (° C.): | 30 | 40 | 50 | 60 | 70 | 80 | 90 |
|---|---|---|---|---|---|---|---|
| Time for absorption (min): | 40–50 | 36–40 | 25–30 | 17–20 | 12–15 | 8–10 | 5–7 |

As is clear from this table, the time for water absorption changes greatly with the temperature of water and the higher the water temperature, the shorter the time for water absorption. However, at temperatures above 95° C., the pasta or the like becomes completely boiled and it is difficult to cook and serve it "al dente" or with a firm texture.

If the water to be absorbed has low temperatures not higher than 35° C., a prolonged time is required to complete the step of water absorption but, on the other hand, the operating procedure is simpler and requires less energy than when heated water is employed. The use of cool water has the added advantage of ensuring that after the water absorption, the temperature of the pasta or the like can be held sufficiently low to be favorable for the purpose of storage under a chilled or frozen condition.

If, on the other hand, water heated to 35° C. or above is employed, the time required for water absorption can be sufficiently shortened to allow for a shorter production time, the use of smaller equipment and saving of the installation space. The time for water absorption can be substantially reduced at a water temperature of 35–95° C., preferably at 58–92° C.

The temperature for water absorption can be determined appropriately in consideration of the conditions for other steps of the manufacturing process, the type of the apparatus to be employed and the space available.

The degree of water absorption is such that the moisture content of the pasta or the like is 30–70 wt % preferably 40–60 wt %, if the final product is of a quick boiling type. With a low moisture content, the boiling time for cooking the pasta or the like as the final product is prolonged and vice versa.

If the final product to be manufactured is instant cooking pasta or the like which is to be prepared by pouring in hot water and leaving it to stand for a while, the degree of water absorption is such that the moisture content of the pasta or the like is 50–70 wt %, preferably 57–65 wt %. After the water absorption, the pasta or the like is reheated (see below).

It is generally held that the "firmness" of boiled pasta or the like is developed by the difference in moisture content between the surface and central portions of each string and the "too tender" state means that the moisture content has become the same in the surface and central portions, whereby the pasta or the like is no longer "firm". If the pasta or the like has absorbed only a small amount of water as the result of water absorption, it must be left to stand for a comparatively long time before it becomes ready to eat after pouring in hot water but, on the other hand, the gradient of moisture content in the surface and central portions is steep enough to provide a firm texture and it takes much time for the cooked pasta or the like to become "too tender". If the pasta or the like has absorbed a large amount of water, it need be left to stand for only a short time before it becomes ready to eat but, at the same time, it will shortly lose firmness.

The water to be absorbed by the pasta or the like may be mixed with desired seasonings, spices or food additives such as table salt, sugar, acids and alcohols in order to assure better keeping quality in the subsequent stages or for the purpose of seasoning to taste. The seasonings, spices or food additives may be dissolved or suspended in the water to be absorbed such that they can be absorbed on or absorbed by the pasta or the like during the water absorption.

The quick boiling pasta or the like which has been produced by the steps of heating, water absorption and cooling can be stored either chilled or frozen for an extended period of time without deterioration in quality. The frozen product can be stored for a longer period than the chilled one.

The thus produced quick boiling pastas or noodles have absorbed a sufficient amount of water that is necessary to accomplish conversion to a-starch and, in addition, the modified starch layer is not sticky at all; hence, they can be cooked "al dente" by boiling in water for a short time not exceeding 3 minutes and can be served on the dish affording the same texture and taste as are obtained by boiling ordinary dry or raw pastas or noodles. If desired, they can be sauteed, mixture with ingredients such as meat, vegetable or shellfish to one's own preference, or spread with sauce.

As already noted, the pasta or the like which has absorbed water is subjected to reheating if the final product is of an instant cooking type which can be cooked by merely pouring in hot water and leaving it to stand for a while. The reheating step ensures that when cooked by the procedure just described above, the prepared pasta or the like is by no means "powdery" but provides smooth palatability together with the desired firmness. The reheating step is performed with dry heat at a temperature of 95–170° C., preferably 100–130° C., for a period of 30 seconds to 8 minutes, preferably 1–4 minutes. The reheating step may be performed direct on the surface of the pasta or the like that have absorbed water or, alternatively, they may be heated as it is contained in a heat-resistant, synthetic bag. The reheated pastas or the like is cooled by leaving them to stand or by immersing in or spraying with water having ordinary or lower temperatures.

The instant cooking pastas or the like which have been produced by the steps of thermal modification of the surface of dry pasta or the like, water absorption, reheating and cooling can be stored either chilled or frozen for an extended period of time without deterioration in quality. The frozen product can be stored for a longer period than the chilled one. If the final product is distributed on the market as it is packed in heat insulating, plastic or paper containers, the consumer can prepare "al dente" or firm pastas or noodles by merely pouring hot water into the container, leaving it to stand for a short time and discarding the hot water or by simply heating in a microwave oven after some preliminary treatment such as water sprinkling. The thus prepared pastas or the like are sufficiently "al dente" or firm that they can be served on the dish affording the same texture and taste as are obtained by boiling ordinary dry or raw pastas or noodles. If desired, they can be sauteed, mixed with ingredients to one's own preference or spread with sauce. Alternatively, they can be served as "dip-to-eat" noodles such as zaru-udon, morisoba and "dip-to-eat" Chinese noodles, affording the same texture as is presented by boiled noodles.

The pastas or the like is preferably cooked by pouring in as much of the hot water as possible so that they will acquire the highest possible temperature throughout after the hot water has been poured in. If the pasta or the like is cool, their temperature may be increased by first pouring in a small amount of hot water and, after discarding that hot water, an increased portion of hot water is poured in; alternatively, the temperature of the product may be raised to a certain level by heating in a microwave oven and then hot water is poured in. By either method, the product can be cooked to taste better than cooked otherwise. If seasonings spices and selected ingredients are preliminarily packed in the container, one may merely pour in hot water and letting stand for only a short time to prepare the desired udon, soba, Chinese soup noodle, etc.

The following examples are provided for the purpose of further illustrating the present invention but are in no way to be taken as limiting.

EXAMPLE 1

One kilogram of dry spaghetti (1.9 mm$^\Phi$) made from the semolina of durum wheat was heated in a dry heating oven at 90° C. for one minute. The spaghetti was then immersed in 1% salted hot water at 60° C. for 20 minutes to have water absorbed. As a result of the water absorption, the spaghetti weighed 1.9 kg with a moisture content of 51%.

Even after the water absorption, the spaghetti had a smooth surface in the absence of any specks due to surface dissolution. The spaghetti was stored overnight in a refrigerator and then boiled in water for 60 seconds. The fully boiled spaghetti was "al dente" and had the desired firmness.

EXAMPLES 2 AND 3

Quick boiling spaghetti was produced as in Example 1 except that the heating and water absorption steps were performed under the conditions set forth below. The produced spaghetti was then stored in either a frozen or chilled state and boiled in water for a specified time. The results of evaluation of the boiled spaghetti are also shown below.

| Example | Heat treatment | Water absorption | Boil time | Surface specks | Taste |
|---|---|---|---|---|---|
| 2 | 60° C. 2 min | 60° C. 20 min | 60 sec | none | good |
| 3 | 85° C. 1 min and 20 sec | 80° C. 10 min | 60 sec | none | good |

EXAMPLE 4

One kilogram of dry spaghetti (1.7 mm$^\Phi$) made from the semolina of durum wheat was heated in a dry heating oven at 90° C. for two minutes. The spaghetti was then immersed in water at 30° C. for 45 minutes to have water absorbed. As a result of the water absorption, the spaghetti weight 1.8 kg with a moisture content of 50%.

Even after the water absorption, the spaghetti had a nonsticky smooth surface in the absence of any surface dissolution and specks. The spaghetti was stored overnight in a refrigerator and then boiled in water for 1 minute. The fully boiled spaghetti was "al dente" and had the desired firmness.

EXAMPLE 5

One kilogram of dry spaghetti (1.9 mm$^\Phi$) made from the semolina of durum wheat was heated in boiling water for one minute and 30 seconds. The heated spaghetti was spread in thin layers and left to stand at room temperature for 30 minutes so that it became cool and dry. Subsequently, the spaghetti was immersed in 1% salted cold water at 10° C. for 80 minutes to have water absorbed. As a result of the water absorption, the spaghetti weighed 1.7 kg with a moisture content of 47%.

Even after the water absorption, the spaghetti had a nonsticky smooth surface in the absence of any surface dissolution and specks. The spaghetti was stored overnight in a refrigerator and then boiled in water for 1 minute and 30 seconds. The fully boiled spaghetti was "al dente" and had the desired firmness.

EXAMPLE 6

One kilogram of dry spaghetti (1.7 mm$^\Phi$) made from the semolina of durum wheat was heated in a dry heating oven at 150° C. for 1 minute. The spaghetti was then immersed in hot water at 80° C. for 16 minutes to have water absorbed; after reheating in a dry heating oven at 150° C. for 3 minutes, the spaghetti was cooled by immersing in cold water at 10° C. The cooled spaghetti weighed 2.2 kg with a moisture content of ca. 59%. After refrigeration overnight, ca. 500 ml of hot water was added to 250 g of the spaghetti, the water was discarded 5–10 seconds later, another 500 ml of hot water was poured in, the spaghetti was left to stand for 1 minute and the hot water was discarded. The spaghetti was found to be fully boiled and "al dente" with the desired firmness.

What is claimed is:

1. A process for the manufacture of quick boiling or instant cooking pastas or noodles comprising the steps of
   heating dry pastas or noodles with dry heat to modify the surface layer portion so that it will neither dissolve or disintegrate after being contacted with water;
   contacting the pastas or noodles with an amount of water sufficient to have said water absorbed therewithin to adjust the moisture content of the pastas or noodles to a moisture content of 30–70% wherein the surface of the pastas or noodles is not sticky;
   separating the pastas or noodles from water; and
   optionally reheating the pastas or noodles whereby the pastas or noodles are of an instant cooking type.

2. A process according to claim 1 wherein the heating by dry heat is done at 60–200° C. for a period ranging from several seconds to 30 minutes.

3. A process according to claim 2, wherein the heating is done at 60–95° C. for a period ranging from several seconds to 30 minutes.

4. A process according to claims 1, wherein the heating is done by means of heat rays or heated air.

5. A process according to claim 1, wherein said step of water absorption comprises immersing the pastas or noodles in heated water at 35–100° C. or spraying them with heated water at 35–100° C.

6. A process according to claim 5, wherein said step of water absorption comprises immersing the pastas or noodles in hot water at 80–95° C. for a sufficient time to adjust their moisture content to 50–70 wt %.

7. A process according to claim 6, wherein said moisture content is adjusted to 57–65 wt %.

8. A process according to claim 7, wherein said hot water has a temperature of 88–95° C.

9. A process according to claim 1, wherein said reheating step is performed at 95–170° C. for a period from 30 seconds to 8 minutes.

10. A process according to claim 9, wherein said reheating step is performed at 100–130° C. for 1–4 minutes.

11. A process according to claim 5, wherein said step of water absorption is performed using heated water at 58–92° C. such that the moisture content of the pastas or noodles is adjusted to 40–60 wt %.

12. A process according to claim 4, wherein said step of water absorption is performed by immersing the pastas or noodles in water at less than 35° C. or spraying them with water at less than 35° C. such that their moisture content is adjusted to 30–70 wt %.

13. A process according to claim 12, wherein said moisture content is adjusted to 40–60 wt %.

14. A process for the manufacture of quick boiling pastas or noodles comprising the steps of
   heating dry pastas or noodles with dry heat to modify the surface layer portion,
   contacting the pastas or noodles with water to absorb water throughout said pastas or noodles and to adjust the moisture content of the pastas or noodles to 30–70 wt %, and separating the pastas or noodles from water.

15. A process according to claim 14, wherein the heating is done at 60–95° C. for a period ranging from several seconds to 30 minutes.

16. A process according to claim 14, wherein the heating is done by means of heat rays or heated air and the heated pastas or noodles are subjected to the step of water absorption without drying their surface.

17. A process according to claim 14, wherein said step of water absorption comprises immersing the pastas or noodles in heated water at 35–100° C. or spraying them with heated water at 35–100° C.

18. A process according to claim 17, wherein the pastas or noodles are immersed in hot water at 80–95° C. for a sufficient time to adjust their moisture content to 50–70 wt %.

19. A process according to claim 18, wherein said moisture content is adjusted to 57–65 wt %.

20. A process according to claim 17, wherein said hot water has a temperature of 88–95° C.

21. A process according to claim 17, wherein said step of water absorption is performed using heated water at 58–92° C. such that the moisture content of the pastas or noodles is adjusted to 40–60 wt %.

22. A process according to claim 1, wherein said step of water absorption is performed by immersing the pastas or noodles in water at less than 35° C. such that their moisture content is adjusted to 30–70 wt %.

23. A process according to claim 22, wherein said moisture content is adjusted to 40–60 wt %.

24. A process for the manufacture of quick boiling or instant cooking pastas or noodles, comprising
   dry heating dry pastas or noodles at a temperature of about 40–200° C. for a time sufficient, in the range of from several seconds to 30 minutes, to achieve uniform heating without causing deterioration and to form a thin modified starch film on the surface of said pastas or noodles and to obtain a modified surface which will neither dissolve or disintegrate after being contacted with water;
   then contacting said dry heated pastas or noodles with sufficient water at no greater than 95° C. to absorb water into said pastas or noodles and provide a moisture content of 30–70 wt %, and separating the resultant water-absorbed noodles from any remaining water; and
   optionally then reheating said past as or noodles,
   whereby quick boiling or instant cooking pastas or noodles are obtained having a substantially non-sticky smooth surface and is substantially free of surface dissolution and specs and which can be cooked to the al dente by contacting said pastas or noodles with hot or boiling water for 0.5–3 minutes.

25. A process according to claim 24 wherein said pastas are spaghetti having a diameter of about 1.7 mm, and said contacting with water to obtain water absorption is carried out according to the following temperature and time relationship:

| Temperature of water (° C.): | 30 | 40 | 50 | 60 | 70 | 80 | 90 |
|---|---|---|---|---|---|---|---|
| Time for absorption (min): | 40–50 | 36–40 | 25–30 | 17–20 | 12–15 | 8–10 | 5–7. |

26. A process according to claim 24, wherein said dry heating temperature is 60–95° C. and said heating time is 10 seconds to 25 minutes; and said water absorption step is carried out at a temperature of 58–92° C. to provide a moisture content of 57–65 wt %.

27. A process according to claim 26, wherein said optional reheating is not carried out, whereby quick boiling pastas or noodles are obtained.

28. A process for the manufacture of quick boiling or instant cooking pastas or noodles comprising the steps of heating dry pastas or noodles with dry heat to modify the surface layer portion so that it will neither dissolve nor disintegrate after being contacted with water;

contacting the pastas or noodles with an amount of water sufficient to have said water absorbed therein to adjust the moisture content of the pastas or noodles to a moisture content of 30–70% wherein the surface of the pastas or noodles substantially does not dissolve or disintegrate;

separating the pastas or noodles from water; and optionally reheating the pastas or noodles whereby the pastas or noodles are of an instant cooking type.

* * * * *